United States Patent
Dalal et al.

(10) Patent No.: US 7,509,468 B1
(45) Date of Patent: Mar. 24, 2009

(54) POLICY-BASED DATA PROTECTION

(75) Inventors: Chirag Deepak Dalal, Maharashtra (IN); Niranjan S. Pendharkar, Maharashtra (IN); Angshuman Bezbaruah, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 298 days.

(21) Appl. No.: 11/346,108

(22) Filed: Feb. 2, 2006

(51) Int. Cl.
*G06F 12/14* (2006.01)
(52) U.S. Cl. .................................. 711/163; 711/152
(58) Field of Classification Search ........................ None
See application file for complete search history.

(56) References Cited

U.S. PATENT DOCUMENTS

| | | | | |
|---|---|---|---|---|
| 5,636,359 A | * | 6/1997 | Beardsley et al. | 711/122 |
| 2002/0091710 A1 | * | 7/2002 | Dunham et al. | 707/200 |
| 2007/0067359 A1 | * | 3/2007 | Barrs et al. | 707/203 |

OTHER PUBLICATIONS

Srineet Sridharan, pending U.S. Patent Application entitled "Version Mapped Incremental Backups With Version Creation Condition," U.S. Appl. No. 11/392,382; filed Mar. 29, 2006, including Specification: pp. 1-23: Figures 1-7 on 6 sheets.

* cited by examiner

*Primary Examiner*—Than Nguyen
(74) *Attorney, Agent, or Firm*—Campbell Stephenson, LLP

(57) ABSTRACT

A method, system, computer system, and computer-readable medium to trigger protection of a set of data based upon the type or class of the data in the set and/or an amount of data that has changed since some prior point in time. Types of protection that can be triggered include full backup, incremental backup, switching to a different type of continuous replication, intermittent replication, and virus detection. Using the type of the data as a basis for triggering protection enables the operational significance of different sets of data to be taken into account when allocating protection resources. Data sets may be pre-classified, or an automated determination of the type of a data set may be determined by variables measured at run-time. The amount of the changed data in a set that triggers protection may vary in accordance with the type of the set of data.

19 Claims, 3 Drawing Sheets

| Type of Data | Amount of Data Changed | Form of Protection Triggered |
|---|---|---|
| Class I | 25% | Incremental Backup |
| Class I | 30 files | Incremental Backup |
| Class I | 75% | Full Backup |
| Class I | 90% | Full Backup + Intermittent Replication |
| Class II | 50% | Incremental Backup |
| Class II | 90% | Full Backup |
| Class III | 75% | Incremental Backup |

*FIG. 3A Variables Of Data-Oriented Protection Policy*

| Type of Storage | Type of Data | | Form of Protection Triggered |
|---|---|---|---|
| | File Type | Amount of Data Changed | |
| Tier I | Database | 50% | Full Backup |
| Tier I | Database | 90% | Intermittent Replication |
| Tier II | Database | 75% | Incremental Backup |
| Tier II | Database | 90% | Full Backup |
| Tier I | Executable | 15% | Virus Detection |

*FIG. 3B Variables Of Data-Oriented Protection Policy*

POLICY-BASED DATA PROTECTION

BACKGROUND OF THE INVENTION

Information drives business. For businesses that increasingly depend on data and information for their day-to-day operations, unplanned downtime due to data loss or data corruption can hurt their reputations and bottom lines. Data corruption and loss can occur when software or equipment malfunctions, when administrators make mistakes, and when systems and data are deliberately attacked.

Businesses are becoming increasingly aware of the costs imposed by data corruption and loss and are taking measures to plan for and recover from such events. Often these measures include making backup copies of primary, or production, data, which is 'live' data used for operation of the business. Backup copies of primary data are made on different physical storage devices, and often at remote locations, to ensure that a version of the primary data is consistently and continuously available.

Backup copies of data are preferably updated as often as possible so that the copies can be used in the event that primary data are corrupted, lost, or otherwise need to be restored. One way to achieve consistency and avoid data loss is to ensure that every update made to the primary data is also made to the backup copy, preferably in real time. Often such "duplicate" updates are made on one or more "mirror" copies of the primary data by the same application program that manages the primary data. Mirrored copies of the data are typically maintained on devices attached to or immediately accessible by the primary node to avoid delays inherent in transferring data across a network or other communication link to a secondary node and processing the data at the secondary node.

In addition to maintaining mirrored copies of primary data locally, primary data are often replicated to remote sites across a network. A copy of the primary data is made and stored at a remote location, and the replica is updated by propagating any changes to the primary data to the replica copy. If the primary data are replicated at different sites, and if the failure of the systems storing the data at one site is unlikely to cause the failure of the corresponding systems at another site, replication can provide increased data reliability. Thus, if a disaster occurs at one site, an application that uses that data can be restarted using a replicated copy of the data at another site.

Even in a protection scheme including both mirroring and replication of primary data, primary data are not completely safe from corruption. For example, a breach of security of the primary node typically will enable an attacker to access and corrupt all resources accessible from the primary node, including the mirrored copies of data. Such corruption may include infecting primary data with a virus. This problem is exacerbated when primary data are corrupted and the result of the update corrupting the primary data is replicated to secondary nodes hosting backup copies of the data. When replication of corrupted primary data occurs, all copies of the data are corrupted. "Backing out" the corrupted data and restoring the primary data to a previous state is required on every copy of the data that has been made. Therefore, frequent scanning for infected sets of data is important.

Most data protection schemes, such as backup, replication, and virus protection, are scheduled to occur at particular points in time. However, even when protection operations are performed very frequently, a large amount of unprotected data may exist at any point in time waiting to be replicated or copied to a backup storage device. This unprotected data is especially significant in environments with large amounts of rapidly changing data. Time-based data protection may be inadequate for such environments.

Furthermore, data that are highly critical are often protected according to the same schedule as data that are of little operational importance to the organization or that can be easily reproduced. A scheme that takes into account the operational significance of the data could consider the effort involved in reconstructing the data if lost and use protection resources more efficiently. In addition, if only a small portion of a set of data has changed since the last backup operation, protecting the entire set of data with each backup operation can waste significant resources.

A solution is needed that enables data protection to be tailored in accordance with the type of data to be protected and the amount of data that has changed. Preferably, the solution should enable different types of protection to be triggered dynamically depending upon the nature of the data as the data change. The solution should enable the operational significance of a set of data to be taken into account when allocating protection resources.

SUMMARY OF THE INVENTION

The present invention in one embodiment involves triggering protection of a set of data based upon the type or class of the data in the set and an amount of data that has changed since some prior point in time. Using the type of the data as a basis for triggering protection enables the operational significance of different sets of data to be taken into account when allocating protection resources. Data sets may be pre-classified according to data type or class by a user. Alternatively, an automated determination of the type or class of a data set may be determined by variables measured at run-time, such as frequency of update of the data set in a recent time period.

The amount of the changed data in a set that triggers protection of the set of data may vary in accordance with the type of the set of data. The amount of the data that has changed may be determined, for example, as a percentage of the set of data that has changed during a time period or since the set of data was last protected. Alternatively, the amount of the data that has changed may be determined as a percentage of total storage or the number of bytes belonging to the class or type of data.

Protection of the set of data can include making a backup copy of the set of data or of a portion of the set of data. For example, only the portion of the data that has changed since a last backup was made may be included in the backup copy. Another type of protection includes replicating a portion of the set of data from a first node to a second node, either within a cluster or within a network. Yet another type of protection involves determining whether the set of data is infected by a virus and disinfecting the set of data.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous features and advantages made apparent to those skilled in the art by referencing the accompanying drawings.

FIGS. 3A and 3B are tables of variables of different types of data-oriented protection policies that can be implemented using the present invention.

The use of the same reference symbols in different drawings indicates similar or identical items.

DETAILED DESCRIPTION

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
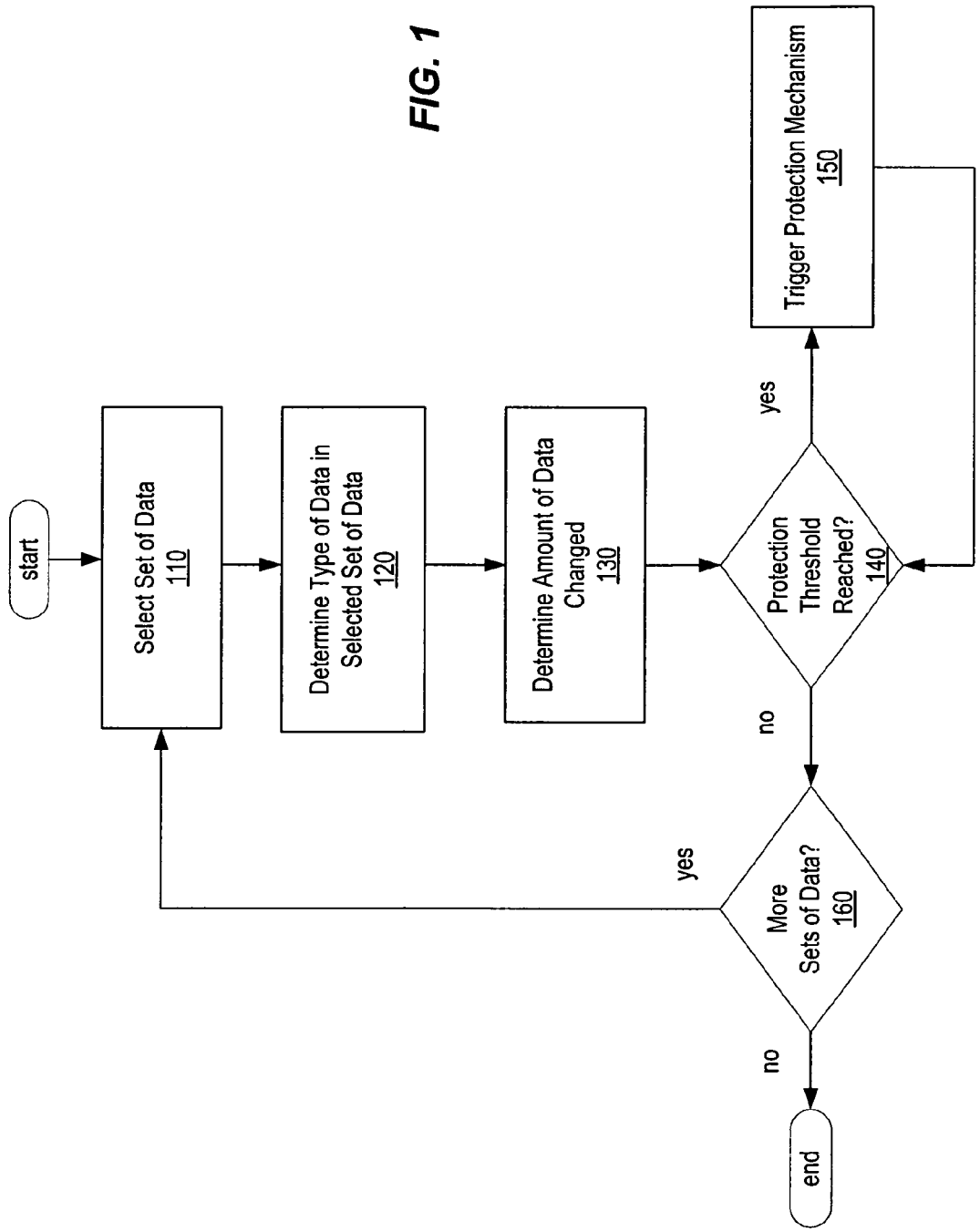
FIG. 1 is a flowchart showing one embodiment of a technique for triggering a protection mechanism depending upon a type or class of the data set and the amount of data that have changed since a prior point in time.

FIG. 1 shows an embodiment of a technique for triggering a protection mechanism depending upon a type or class of a data set and an amount of data that has changed since a prior point in time. This technique may be implemented, for example, as a data protection system, which may be implemented in hardware, software, and/or firmware. The data protection system may include a monitoring sub-system, module, means, and/or executable instructions (hereinafter referred to as a monitoring sub-system) that monitors sets of data to be protected. The term "set of data" is used to describe any collection of data for which protection is sought. Examples of sets of data include a single file, an entire directory of files, a collection of files having a particular file name extension, all files stored on a particular device, a data volume, a subset of a data volume, a database table, an entire database, or any other organization of related data.

The sets of data to be protected may be monitored continuously to identify when a "trigger" has been reached (e.g., a given amount of data has changed). However, other means of determining when data protection should be initiated, such as monitoring metadata changes for a particular type of data, are considered to be within the scope of the invention.

In FIG. 1, one of the sets of data that is being monitored is selected in "Select Set of Data" step 110. Processing continues to "Determine Type of Data in Selected Set of Data" step 120, where a type or class of data that is contained in the selected set of data is determined. In one embodiment, the type or class of the data is determined by the type of application program that manages the data. For example, a database management application manages databases, a file system manages files, and a word processing application manages documents, and the respective types of data for these applications are databases, files, and documents. In another embodiment, the type of the data is determined by a type of storage in which the set of data is stored. For example, a set of data maintained in a memory cache may need to be protected more frequently than a set of data stored in archival disk storage.

In another embodiment, the type of the data is determined by a classification of storage on which the set of data is stored. For example, some storage management systems enable storage to be classified into "tiers" of importance. Data that must be highly available for critical organizational functions may be stored in a tier for highly available, high-speed, redundant storage, whereas archival data may be stored in a tier for off-line archival disk storage. Sets of data stored in the more critical tiers of storage may need more frequent protection than sets of data stored in less critical tiers.

In yet another embodiment, the type of the data is determined by a characteristic of the storage on which the set of data is stored. For example, data that is stored redundantly (such as on mirrored storage) may need less protection than other data having only one copy.

In one embodiment, a type-specifying sub-system enables a user to specify the type of data. In another embodiment, a type-determining sub-system is programmed to automatically classify sets of data in accordance with variables specified in a policy database. Examples of variables that can be specified in a policy database are described further with reference to FIGS. 3A and 3B.

Returning to FIG. 1, from "Determine Type of Data in Selected Set of Data" step 120, control transitions to "Determine Amount of Data Changed" step 130, where an amount of data that have changed is determined. One of skill in the art will recognize that the order in which "Determine Type of Data in Selected Set of Data" step 120 and "Determine Amount of Data Changed" step 130 are performed may vary within the scope of the invention.

The amount of the data that has changed may be determined, for example, as a percentage of the set of data that has changed during a time period or since the set of data was last protected. Other mechanisms for determining an amount of the data that have changed can be used within the scope of the invention. For example, if a backup copy of the set of data (also referred to as a snapshot, point-in-time image, frozen image, or, in the case of file system, a checkpoint) has been made, a bitmap or other tracking mechanism may be used to track regions modified after the backup copy was made. The number of regions that have changed since the backup copy was made can be multiplied by the size of each region to give an estimate of the amount of data that have changed.

If a checkpoint of a file system has been made, a number of data blocks modified since the checkpoint was made can be tracked. The number of data blocks modified can be used as an estimate of the amount of data that have changed since the previous checkpoint was made. Alternatively, if a file system is using a file change log to track each file that has been changed, the number of files and the sizes of the changed files can be used to estimate the amount of data that has changed.

As another example, many applications maintain a log of data affected by write operations. To speed write operations, data affected by the write operations are written first to the log, which may be maintained in memory or on high-speed storage devices, and then later copied from the log to permanent storage for the primary set of data. Such a log can be used to determine the amount of data that has changed, which in turn can be used to trigger a protection mechanism. If the protection mechanism is a full backup, and a large amount of data in the data log remains to be copied to permanent storage, backup of the log itself, as well as backup of the primary data set, may be triggered.

Referring again to FIG. 1, from "Determine Amount of Data Changed" step 130, control transitions to "Protection Threshold Reached" decision point 140. At "Protection Threshold Reached" decision point 140, the monitoring subsystem determines whether a protection threshold has been reached for the type of data and the amount of data that have changed. If a protection threshold has been reached, control continues to "Trigger Protection Mechanism" step 150, where a protection mechanism is triggered to protect the selected set of data. A further discussion of the protection mechanism is provided below with reference to FIG. 2.

Referring again to FIG. 1, control returns from "Trigger Protection Mechanism" to "Protection Threshold Reached" decision point 140 to determine whether another threshold for another type of protection mechanism has been reached. If so, control proceeds to "Trigger Protection Mechanism" step 150 to trigger the additional protection mechanism and continues as described above. If another protection threshold has not been reached for the selected set of data at "Protection Threshold Reached" decision point 140, control proceeds to "More Sets of Data" decision point 160, where a determination is made whether other sets of data remain to be monitored. If no sets of data remain to be monitored, processing ends. However, the monitoring sub-system can cycle continuously through all sets of data to be protected, so that normal operation at "More Sets of Data" decision point 160 would indicate that other sets of data remain to be monitored. If sets of data remain to be monitored, control returns to "Select Set of Data" step 110, where another set of data to be monitored is selected, and the process described with reference to FIG. 1 is repeated for that set of data.

Figure 2:
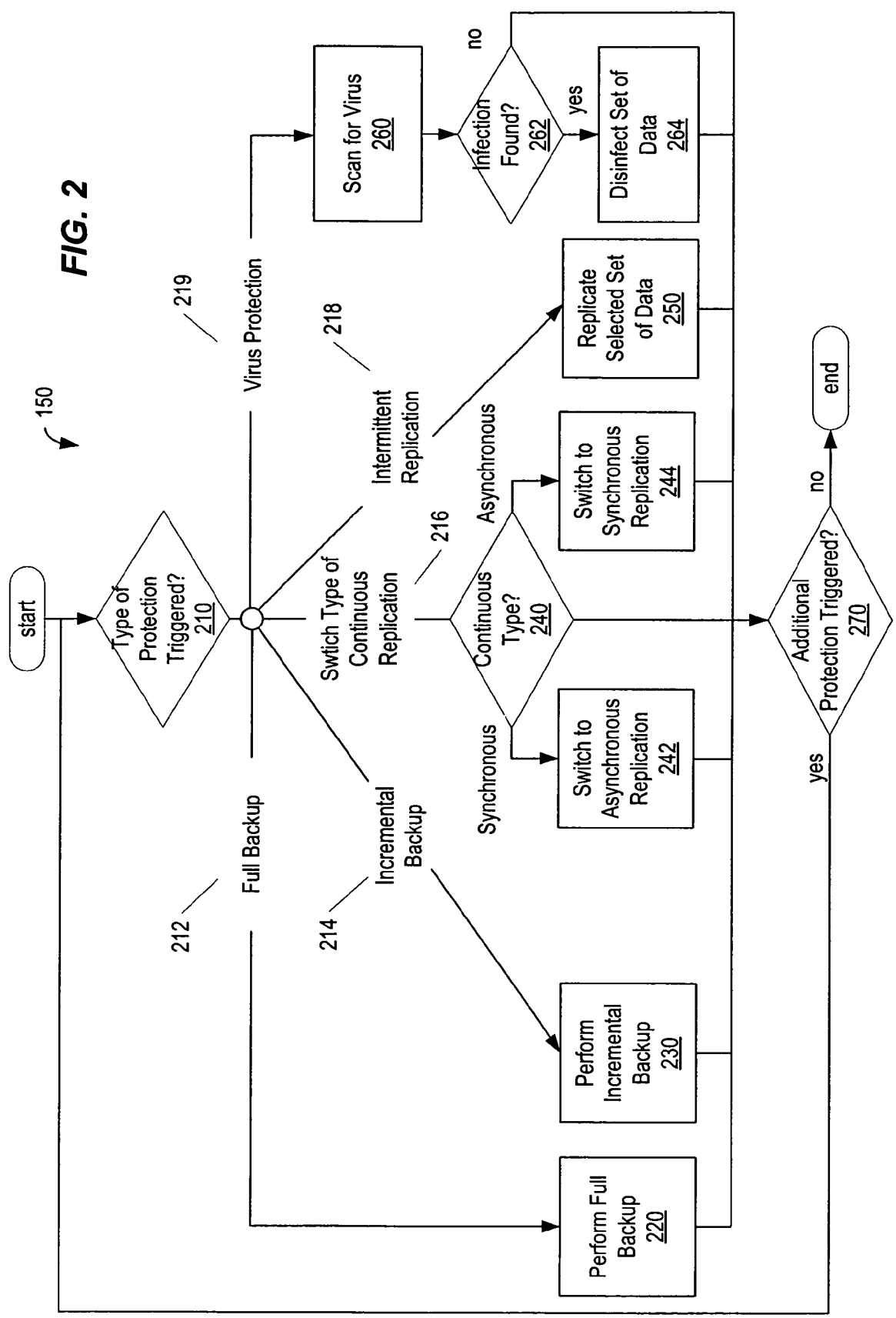
FIG. 2 shows one embodiment of the "Trigger Protection Mechanism" step of the flowchart of FIG. 1.

FIG. 2 shows one embodiment of the "Trigger Protection Mechanism" step 150 of FIG. 1. Once a protection mechanism has been triggered, control begins at "Type of Protection Triggered?" decision point 210. It is envisioned that one or more of many different types of protection may be triggered. In addition, in accordance with one embodiment of the invention, the type of protection can be determined in accordance with the type of the data and the amount of the data that has changed since the last time the data set was protected. In another embodiment, all data sets are subjected to the same protection mechanism when it is determined that a threshold for the protection mechanism has been reached.

In FIG. 2, at "Type of Protection Triggered?" decision point 210, several alternative protection mechanisms are shown. These protection mechanisms include full backup 212, incremental backup 214, switching the type of continuous replication 216 (where data are replicated continuously, either asynchronously or synchronously), intermittent replication 218 (where data are replicated intermittently rather than continuously), and virus protection 219. The types of protection mechanisms are not limited to these examples, and other forms of protection are within the scope of the invention. In one embodiment, the types of protection mechanisms that are triggered are determined based upon the type of data and the amount of data that has changed since a given point in time.

If full backup protection mechanism 212 is triggered at "Type of Protection Triggered?" decision point 210, control proceeds to "Perform Full Backup" step 220, where a full backup of the selected set of data is performed. Control proceeds to "Additional Protection Triggered?" decision point 270, where a determination is made whether an additional type of protection has been triggered. For example, it is possible that more than one type of protection has been triggered by a given condition, as will be explained further with reference to FIGS. 3A and 3B. If another type of protection has been triggered, control returns to "Type of Protection Triggered?" decision point 210, where a determination is made of the type of the additional protection mechanism. If no other type of protection has been triggered at "Additional Protection Triggered?" decision point 270, processing described with reference to FIG. 2 is complete. Because FIG. 2 represents the "Trigger Protection Mechanism" step 150 for the selected set of data, control returns to "Protection Threshold Reached" decision point 140 of FIG. 1.

If an incremental backup protection mechanism 214 has been triggered at "Type of Protection Triggered?" decision point 210, control proceeds to "Perform Incremental Backup" step 230, where an incremental backup of the selected set of data is performed. Making an incremental backup may include making a backup copy of, for example, only the data that have changed since the previous backup copy was made. Alternatively, making an incremental backup may include making a backup copy of data that have changed since a given point in time. When the incremental backup has been performed, control proceeds to "Additional Protection Triggered?" decision point 270, where control proceeds as described above.

Another type of protection mechanism is to replicate data from a primary node to one or more secondary nodes. Replication of data can be performed continuously or intermittently. Continuous replication involves copying the result of each write operation on the primary node to one or more secondary nodes. Intermittent replication is discussed in further detail below.

Continuous replication may be performed either synchronously or asynchronously. With continuous synchronous replication, an update is posted to the secondary node and acknowledged to the primary node before completing the update at the primary node. In the event of a disaster at the primary node, data can be recovered from the secondary node without loss because the copies of the data at the primary and secondary nodes contain the same data.

With continuous asynchronous replication, updates to data are immediately reflected at the primary node and are persistently queued to be forwarded to each secondary node. Data at the secondary node therefore may lag behind data at the primary node. Asynchronous replication enables application programs to process data more quickly, as no delay is incurred waiting for secondary nodes to receive changes to data and acknowledge their receipt. Upon failure of the primary node, however, the secondary nodes cannot be assumed to have an up-to-date version of the primary data.

Intermittent replication may be triggered upon the occurrence of certain events or conditions, or upon expiration of a given time period, rather than being performed continuously. With intermittent replication, copies of a set of data are made periodically, rather than copying the result of each update transaction. In intermittent replication, changed data resulting from groups of update transactions are transmitted at a fixed time interval or based upon the occurrence of an event. To avoid copying the entire data volume each time, "snapshots" of the data volume are taken and regions containing data changed are tracked. Only the regions of data changed after the snapshot was taken are transmitted to the secondary node.

A decision regarding whether to replicate data synchronously, asynchronously, or intermittently depends upon the nature of the application program using the data as well as numerous other factors, such as available bandwidth, network round-trip time, the number of participating servers, and the amount of data to be replicated. A policy-based protection scheme can take those factors into account in addition to the type of data and amount of data changed. Therefore, a type of replication could be chosen to protect a given set of data depending upon the state of the environment.

Referring again to FIG. 2, "Type of Protection Triggered?" decision point 210 represents a switch in the type of continuous replication 216. For example, if data are being replicated asynchronously and a data log becomes full, a switch to synchronous replication may be desirable until the data log can be cleared. This switch from asynchronous to synchronous replication ensures that all changes to primary data are captured and remain consistent with data on the secondary node. When the data log has been cleared and is operating normally, replication may be switched back from synchronous to asynchronous.

If the protection mechanism that has been triggered at "Type of Protection Triggered?" decision point 210 is a switch in the type of continuous replication 216, control proceeds to "Continuous Type" decision point 240. If the continuous replication type is synchronous, control proceeds to "Switch to Asynchronous Replication" step 242. If the continuous replication type is asynchronous, control proceeds to "Switch to Synchronous Replication" step 244. When the type of continuous replication has been switched, control proceeds to "Additional Protection Triggered?" decision point 270, where control proceeds as described above.

If intermittent replication protection mechanism 218 has been triggered at "Type of Protection Triggered?" decision point 210, control proceeds to "Replicate Selected Set of Data" step 250, where the selected set of data is replicated. Control then proceeds to "Additional Protection Triggered?" decision point 270, where control proceeds as described above.

If virus protection mechanism 219 is triggered at "Type of Protection Triggered?" decision point 210, control proceeds to "Scan for Virus" step 260, where the selected set of data is scanned for an indication that the selected set of data has been infected by a virus. If an infection is found at "Infection Found?" decision point 262, control proceeds to "Disinfect Set of Data" step 264. The selected set of data is disinfected and control proceeds to "Additional Protection Triggered?" decision point 270, where a determination is made whether an additional type of protection has been triggered. Control then proceeds as described above.

If no infection is found at "Infection Found?" decision point 262, control proceeds to "Additional Protection Triggered?" decision point 270, where a determination is made whether an additional type of protection has been triggered. Control then proceeds as described above.

FIGS. 3A and 3B are tables of variables of different types of data-oriented protection policies that can be used to implement one embodiment of the present invention. It is envisioned that an administrator or user can establish tables similar to those of FIG. 3A and/or FIG. 3B to implement a policy-based protection scheme. Such an administrator could specify variables and rules for the data-oriented policy protection using a policy administration sub-system, module, means, and/or instructions.

FIG. 3A shows a table of variables that can be used to implement a policy-based data protection scheme. The table of FIG. 3A includes a type of data, an amount of data that has changed, and a type of protection triggered. In the example, three types of data are shown, indicated as Class I, II, and III. These classes can be considered to be a measure of the critical nature of the data, where Class I data is the most critical data and Class III data is the least critical. Specific sets of data may be classified as belonging to one of the classes in a policy administration module. By manually specifying the class to which each set of data belongs, a variety of factors including the operational significance of each set of data may be taken into account when determining appropriate protection mechanisms for specific sets of data. Alternatively, rules based upon different combinations of variable values can be specified to automatically include a set of data in a particular class.

In FIG. 3A, class I data are protected in varying ways depending upon the amount of data that has changed since a previous point in time. If 25% of a particular set of class I data have changed since the previous point in time, an incremental backup is triggered. Such an incremental backup would be designed to capture the respective 25% of the set of data that have changed. In addition, if 30 files have changed since the previous point in time, an incremental backup is triggered. If 75% of a set of class I data have changed, a full backup of the set of data is triggered. If 90% of the set of class I data have changed, a full backup as well as intermittent replication to a secondary node is triggered.

Similarly, in FIG. 3A, class II data are protected in varying ways depending upon the amount of data that has changed. If 50% of a particular set of class II data have changed, an incremental backup is triggered. Such an incremental backup would be designed to capture the respective 50% of the set of data that have changed. If 90% of the set of class II data have changed, a full backup is triggered. Class III data is protected whenever 75% of the set of data have changed. In this situation, an incremental backup of the 75% of the class III data is made.

FIG. 3B shows an alternative way to specify protection to be afforded a particular set of data. The table of FIG. 3B indicates a type of data that is determined by a combination of the type of storage on which the set of data is stored and the type of file containing the set of data. Some file systems or other storage systems classify storage into tiers, indicating the importance of the data stored within. In the example, three types of data are shown, a database file type stored in tier I storage; a database file type stored in tier II storage; and an executable file stored in tier I storage. The table also includes an amount of data that has changed and a type of protection triggered.

In accordance with the policy variables shown in FIG. 3B, a database file type stored in tier I storage will receive a full backup when 50% of the data have changed since the last time the database file was protected. The database file stored in tier I storage will be intermittently replicated when 90% of the data have changed. A database file type stored in tier II storage will receive an incremental backup when 75% of the data have changed and a full backup when 90% of the data have changed. An executable file stored in tier I storage will be scanned for virus detection when 15% of the data in the executable file have changed.

In one embodiment, the invention further includes determining whether the amount of the data that has changed reaches a threshold of a capacity of storage available to store backup data. For example, if the amount of data that has changed reaches 80% of the available storage for storing backup data, protection may be triggered. Other measures can also be taken. For example, if the amount of the data that has changed reaches the threshold, the method can identify a critical portion of the set of data to protect and trigger protection of that critical portion. An older version of the data also may be deleted to make room for a new backup copy of the data. Taking a capacity of available storage into account in determining an appropriate type of protection could be enabled by adding appropriate variables and values to a table such as the tables of FIGS. 3A and 3B.

The present invention provides many advantages. Data protection can be tailored in accordance with the type of data to be protected and the amount of data that has changed since a previous point in time. Using a policy-based protection scheme, different types of protection can be triggered for a given set of data dynamically as the nature of the set of data changes. The operational significance of a set of data can be taken into account when allocating protection resources.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiments include components contained within other components. It is to be understood that such architectures are merely examples, and that in fact many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    determining a first amount of data that has changed in a first set of data since a first point in time;
    determining a second amount of data that has changed in a second set of data since a second point in time;
    comparing the first amount of data to a first predetermined amount of data;
    comparing the second amount of data to a second predetermined amount of data, wherein
        the first predetermined amount of data does not equal the second predetermined amount of data; and
    selecting one of a plurality of protection mechanisms for protecting the first set of data using a type of data in the first set of data and the first amount of data that has changed in the first set of data, if the comparing the first amount of data to the first predetermined amount of data indicates that the selecting should be performed.

2. The method of claim 1 further comprising:
    determining whether protection of the first set of data is needed using a type of data in the first set of data and the first amount of data that has changed.

3. The method of claim 1 wherein
    the first amount of data that has changed is determined by multiplying a number of data blocks that contain changed data of the first set of data by sizes of the data blocks, respectively.

4. The method of claim 1 wherein
    the first amount of data that has changed is determined as a percentage of bytes that contain a type of data in the first set of data.

5. The method of claim 1 wherein the first amount of data that has changed is calculated as a percentage of total storage available to store the first set of data.

6. The method of claim 1, wherein the plurality of protection mechanisms comprises:
   making a copy of a first portion of the first set of data;
   replicating a second portion of the first set of data from a first node to a second node;
   disinfecting the first set of data if the first set of data is infected by a virus.

7. The method of claim 1, wherein the first amount of data that has changed comprises a percentage of the first set of data that has changed since the first point in time.

8. The method of claim 1, wherein a type of data in the first set of data is determined by a type of storage on which the first set of data is stored.

9. The method of claim 1, wherein a type of data in the first set of data is specified by a user.

10. The method of claim 1, further comprising: determining whether the first amount of data that has changed has reached a threshold of a capacity of available storage for storing a copy of the first set of data.

11. The method of claim 10 further comprising:
    if the first amount of data has reached the threshold, identifying a portion of the first set of first data to protect, wherein
    the protection of the first set of data comprises protection of the portion of the first set of data.

12. A computer system comprising:
    a processor configured to execute instructions; and
    a memory coupled to the processor, wherein
    the memory comprises the instructions, and
    the instructions implement a method comprising
        determining a first amount of data that has changed in a first set of data since a first point in time,
        determining a second amount of data that has changed in a second set of data since a second point in time,
        comparing the first amount of data to a first predetermined amount of data,
        comparing the second amount of data to a second predetermined amount of data, wherein
            the first predetermined amount of data does not equal the second predetermined amount of data, and
        selecting one of a plurality of protection mechanisms for protecting the first set of data using a type of data in the first set of data and the first amount of data that has changed in the first set of data, if the comparing the first amount of data to the first predetermined amount of data indicates that the selecting should be performed.

13. A system comprising:
    first determining means for determining a first amount of data that has changed in a first set of data since a first point in time;
    second determining means for determining a second amount of data that has changed in a second set of data since a second point in time;
    first comparing means for comparing the first amount of data to a first predetermined amount of data;
    second comparing means for comparing the second amount of data to a second predetermined amount of data, wherein
        the first predetermined amount of data does not equal the second predetermined amount of data; and
    selecting means for selecting one of a plurality of protection mechanisms for protecting the first set of data using a type of data in the first set of data and the first amount of data that has changed in the first set of data, if the first comparing means indicates that the selecting means should select one of the plurality of protection mechanisms.

14. The system of claim 13 further comprising:
    third determining means for determining whether protection of the first set of data is needed using a type of data in the first set of data and the first amount of data that has changed.

15. A computer-readable medium comprising:
    instructions executable on a computer system, the instructions comprising
        first determining instructions to determine a first amount of data that has changed in a first set of data since a first point in time,
        second determining instructions to determine a second amount of data that has changed in a second set of data since a second point in time,
        first comparing instructions to compare the first amount of data to a first predetermined amount of data,
        second comparing instructions to compare the second amount of data to a second predetermined amount of data, wherein
            the first predetermined amount of data does not equal the second predetermined amount of data, and
        selecting instructions to select one of a plurality of protection mechanisms for protecting the first set of data using a type of data in the first set of data and the first amount of data that has changed in the first set of data, if the first comparing instructions indicate that the selecting instructions should be executed; and
    computer readable storage media, wherein the instructions are encoded in the computer readable storage media.

16. The computer-readable medium of claim 15 wherein the instructions further comprise:
    third determining instructions to determine whether protection of the first set of data is needed using a type of data in the first set of data and the first amount of data that has changed.

17. The computer-readable medium of claim 15, wherein the plurality of protection mechanisms comprises:
    making a copy of a first portion of the first set of data;
    replicating a second portion of the first set of data from a first node to a second node;
    disinfecting the first set of data if the first set of data is infected by a virus.

18. The computer-readable medium of claim 15, wherein the instructions further comprise:
    determining instructions to determine whether the first amount of data that has changed has reached a threshold of a capacity of available storage for storing a copy of the first set of data.

19. The computer-readable medium of claim 15, wherein the instructions further comprise:
    identifying instructions to identify a portion of the first set of first data to protect if the first amount of data has reached the threshold, wherein
        the protection of the first set of data comprises protection of the portion of the first set of data.

* * * * *